United States Patent
Jost et al.

(10) Patent No.: US 11,690,001 B2
(45) Date of Patent: Jun. 27, 2023

(54) MANAGEMENT OF SECURITY CONTEXTS AT IDLE MODE MOBILITY BETWEEN DIFFERENT WIRELESS COMMUNICATION SYSTEMS

(71) Applicant: TELEFONAKTIEBOLAGET LM ERICSSON (PUBL), Stockholm (SE)

(72) Inventors: Christine Jost, Lund (SE); Noamen Ben Henda, Stockholm (SE); Vesa Torvinen, Sauvo (FI); Monica Wifvesson, Lund (SE)

(73) Assignee: TELEFON AKTIEBOLAGET LM ERICSSON (PUBL), Stockholm (SE)

( * ) Notice: Subject to any disclaimer, the term of this patent is extended or adjusted under 35 U.S.C. 154(b) by 781 days.

(21) Appl. No.: 16/481,242

(22) PCT Filed: Dec. 18, 2017

(86) PCT No.: PCT/EP2017/083250
§ 371 (c)(1),
(2) Date: Jul. 26, 2019

(87) PCT Pub. No.: WO2018/137853
PCT Pub. Date: Aug. 2, 2018

(65) Prior Publication Data
US 2019/0380068 A1  Dec. 12, 2019

Related U.S. Application Data

(60) Provisional application No. 62/451,862, filed on Jan. 30, 2017.

(51) Int. Cl.
*H04L 29/06* (2006.01)
*H04W 48/18* (2009.01)
(Continued)

(52) U.S. Cl.
CPC ......... *H04W 48/18* (2013.01); *H04W 12/041* (2021.01); *H04W 12/043* (2021.01); *H04W 36/0038* (2013.01)

(58) Field of Classification Search
CPC ............. H04W 48/18; H04W 36/0038; H04W 12/041; H04W 12/043
(Continued)

(56) References Cited

U.S. PATENT DOCUMENTS

| 2009/0271623 A1 | 10/2009 | Forsberg et al. |
| 2011/0092213 A1 | 4/2011 | Forsberg et al. |

(Continued)

FOREIGN PATENT DOCUMENTS

| CN | 102017706 A | 4/2011 |
| CN | 102067642 A | 5/2011 |
| CN | 108347728 A | 7/2018 |

OTHER PUBLICATIONS

Catt, "Consideration on inter-RAT mobility between NR and LTE", 3GPP TSG RAN WG3#92, R3-161154, Nanjing, P.R. China, May 23-27, 2016 (5 pages).

(Continued)

*Primary Examiner* — Evans Desrosiers
(74) *Attorney, Agent, or Firm* — Rothwell, Figg, Ernst & Manbeck, P. C.

(57) ABSTRACT

There is provided a solution for managing security contexts at idle mode mobility of a wireless communication device between different wireless communication systems including a first wireless communication system and a second wireless communication system. The first wireless communication system is a 5G/NGS system and the second wireless communication system is a 4G/EPS system. The solution is (Continued)

based on obtaining (S1) a 5G/NGS security context, and mapping (S2) the 5G/NGS security context to a 4G/EPS security context.

21 Claims, 16 Drawing Sheets

(51) Int. Cl.
   *H04W 36/00* (2009.01)
   *H04W 12/041* (2021.01)
   *H04W 12/043* (2021.01)

(58) Field of Classification Search
   USPC .......................................................... 726/4
   See application file for complete search history.

(56) References Cited

U.S. PATENT DOCUMENTS

2019/0150219 A1* 5/2019 Wang .................... H04W 48/18
                                                         370/329
2019/0253888 A1* 8/2019 Jerichow ........... H04W 12/0431

OTHER PUBLICATIONS

Nokia et al., "Corrections to TR 38.801", 3GPP TSG-RAN WG3 Meeting #94, R3-163107, Reno, USA, Nov. 14-18, 2016 (7 pages).
Catt, "Inter-RAT mobility in NR", 3GPP TSG RAN WG2#94, R2-163472, Nanjing, China, May 23-27, 2016 (4 pages).
International Search Report and the Written Opinion of the International Searching Authority, issued in corresponding International Application No. PCT/EP2017/083250, dated Apr. 11, 2018, 10 pages.
Intel "23.502: Way forward for NGC-EPC interworking" 3GPP TSG SA WG2 Meeting #118bis, S2-170333, Jan. 16-20, 2017, Spokane, USA, 3 pages.
3GPP TR 33.899 V0.6.0, "3rd Generation Partnership Project; Technical Specification Group Services and System Aspects; Study on the security aspects of the next generation system (Release 14)" (Nov. 2016).
Ericsson "Registration procedure" SA WG2 Meeting #118BIS, S2-170669, Jan. 16-20, 2017 Spokane, WA, USA, 9 pages.

* cited by examiner

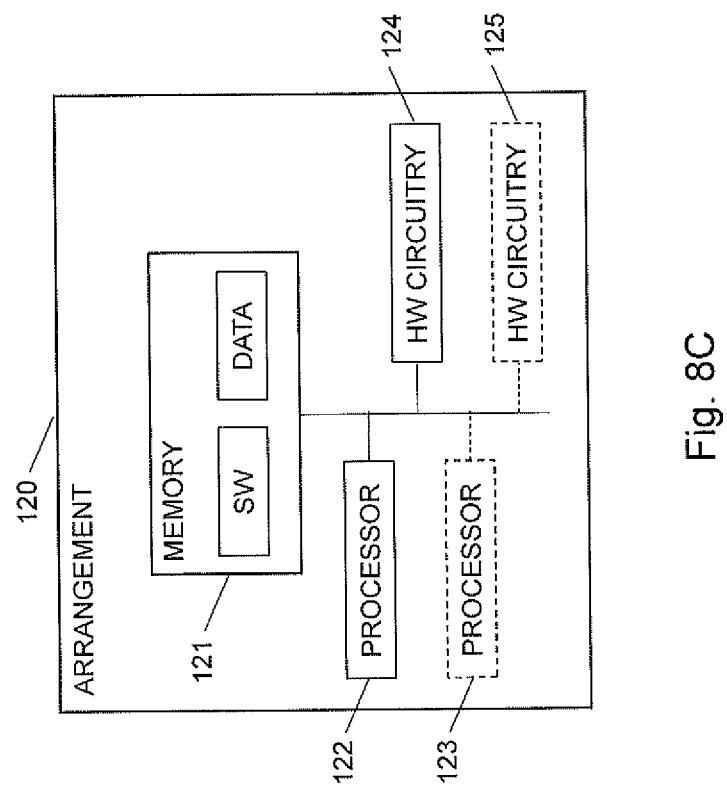
Fig. 8C
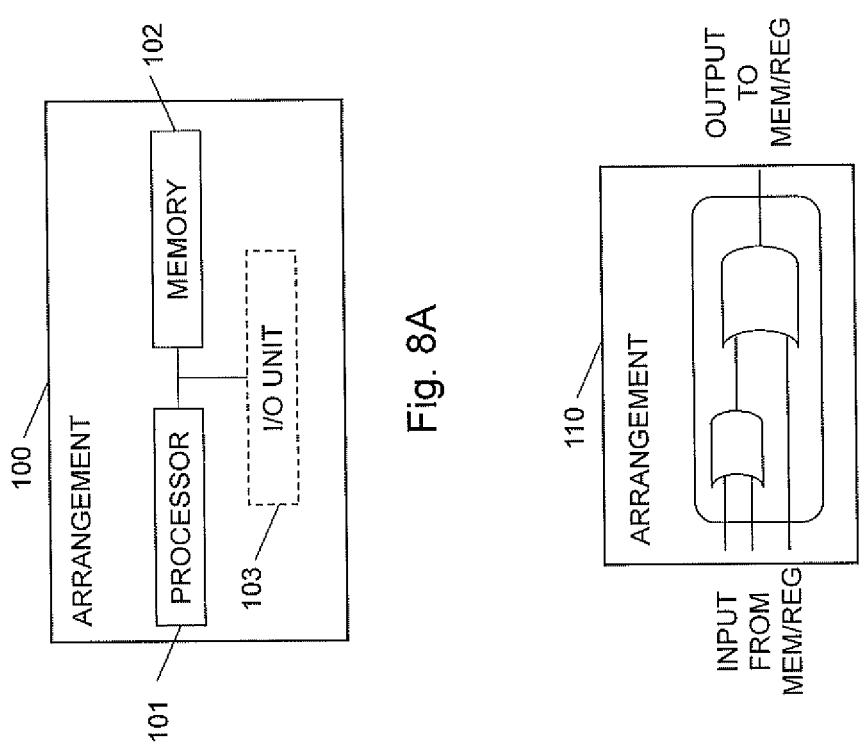
Fig. 8A
Fig. 8B

MANAGEMENT OF SECURITY CONTEXTS AT IDLE MODE MOBILITY BETWEEN DIFFERENT WIRELESS COMMUNICATION SYSTEMS

CROSS REFERENCE TO RELATED APPLICATION(S)

This application is a 35 U.S.C. § 371 National Phase Entry Application from PCT/EP2017/083250, filed Dec. 18, 2017, designating the United States, which claims priority to U.S. Provisional Application No. 62/451,862, filed Jan. 30, 2017, the disclosures of which are incorporated this by reference in their entirety.

TECHNICAL FIELD

The proposed technology relates to a method and corresponding arrangement for managing security contexts at idle mode mobility of a wireless communication device between different wireless communication systems, especially between different generations of wireless communication systems, as well as a corresponding network unit, wireless communication device, computer program, computer-program product and apparatus. The proposed technology also relates to key management and/or key derivation.

BACKGROUND

It may be useful to start with a very brief overview of the Universal Mobile Telecommunications System (UMTS) architecture, sometimes also referred to as 3G, and the Long Term Evolution (LTE) architecture also referred to as 4G.

To start with, the Radio Access Network (RAN) part of the architectures differs in that Universal Terrestrial Radio Access Network (UTRAN) is the 3G/UMTS RAN and Evolved UTRAN (E-UTRAN) is the LTE RAN. UTRAN supports both circuit switched and packet switched services while E-UTRAN only supports packet switched services.

The UTRAN air interface is Wideband Code Division Multiple Access (WCDMA) based on spread spectrum modulation technology while E-UTRAN employs a multi-carrier modulation scheme called Orthogonal Frequency Division Multiple Access (OFDMA). High Speed Packet Access (HSPA) is a set of protocols that extend and improve the performance of existing 3G UMTS networks using the WCDMA protocol.

In 3G/UMTS, the RAN is based on two types of nodes: the access node or base station called NodeB and the Radio Network Controller (RNC). The RNC is the node controlling the RAN, and it also connects the RAN to the Core Network (CN).

FIG. 1 is a schematic diagram illustrating a simplified overview of the core network for UMTS. The core network for UMTS/WCDMA includes:
- the Circuit-Switched (CS) domain with the Mobile Switching Center (MSC) for connection to the Public Switched Telephone Network (PSTN);
- the Packet-Switched (PS) domain with the Serving GPRS Support Node (SGSN) for connection to the RAN, and the Gateway GPRS Support Node (GGSN) for connection to external networks, such as the Internet.

Common for the two domains is the Home Location register (HLR), a database in the home operator's network that keeps track of the subscribers of the operator.

A key design philosophy of the LTE RAN is to use only one type of node, the evolved Node B, also referred to as eNodeB or eNB. A key concept of the LTE CN is to be independent of the radio access technology to the extent possible.

The LTE RAN functions usually involve:
- Coding, interleaving, modulation and other typical physical layer functions;
- Automatic Repeat request (ARQ) header compression and other typical link layer functions;
- User Plane (UP) security functions, e.g., ciphering, and RAN signaling security, e.g., ciphering and integrity protection of RAN originated signaling to the UE; and
- Radio Resource Management (RRM), handover, and other typical radio resource control functions.

The LTE CN functions usually involve:
- Non-Access Stratum (NAS) security functions, e.g. ciphering and integrity protection of CN signaling to the UE;
- Subscriber management;
- Mobility management;
- Bearer management and Quality of Service (QoS) handling;
- Policy control and user data flows;
- Interconnection to external networks.

The evolution and standardization of the LTE CN was called the System Architecture Evolution (SAE) and the core network defined in SAE differs radically from the older generation core network and was therefore named the Evolved Packet Core (EPC).

FIG. 2 is a schematic diagram illustrating a simplified overview of the EPC architecture. The basic nodes of the EPC include:
- the Mobility Management Entity (MME), which is the control plane node of the EPC;
- the Serving Gateway (SG), which is the user plane node connecting the EPC to the LTE RAN; and
- the Packet Data Network Gateway (PDN) Gateway, which is the user plane node connecting the EPC to the Internet.

The MME is normally also connected to a Home Subscriber Server (HSS), which is a database node corresponding to the HLR.

The Serving Gateway and the PDN Gateway may be configured as a single entity.

Sometimes the EPC together with the LTE RAN is denoted Evolved Packet System (EPS).

Currently, the future generation of wireless communications, commonly referred to as Next Generation (NextGen or NG), Next Generation System (NGS) or 5G, is being developed all over the world, although no common 5G standard has yet been set.

The vision of Next Generation wireless communications lies in providing very high data rates, extremely low latency, a manifold increase in base station capacity, and significant improvements of user perceived QoS, compared to current 4G LTE networks.

3GPP SA2 has agreed on the non-roaming architecture illustrated in FIG. 3 in their study in 3GPP TR 23.799 V14.0.0.

The Access and Mobility management Function (AMF), sometimes referred to as the Mobility Management Function, MMF, Core Network Mobility Management (CN-MM) or simply Mobility Management (MM), is the core network node that supports mobility management and is, thus, playing a similar role to the MME in EPC. AMF has a so-called NG2 interface to RAN that corresponds to the so-called S1 interface between MME and RAN in EPC.

In general, mobility management involves handling UEs in both idle mode and connected mode.

Idle mode mobility in 5G/NGS will probably be a special case of the Registration procedure, e.g. see clause 4.2.2.2.2 in v0.1.1 draft 3GPP TS 23.502. In the Registration procedure, User Equipment (UE) needs to register with the network to get authorized to receive services, to enable mobility tracking and to ensure reachability. The Registration procedure is used e.g. when the UE needs to initially register to the 5G system, upon mobility procedures when the UE changes to a new Tracking Area (TA) in idle mode and when the UE performs a periodic update (due to a predefined time period of inactivity), and so forth.

It is also expected that 5G/NGS will allow idle mode mobility from 5G/NGS to 4G/EPS. When a UE moves out of 5G/NGS coverage into 4G/EPS coverage, it will have a 5G/NGS security context, but may not have a 4G/EPS security context.

SUMMARY

It is an object to provide a method for managing security contexts at idle mode mobility of a wireless communication device between different wireless communication systems.

It is also an object to provide an arrangement configured to manage security contexts at idle mode mobility of a wireless communication device between different wireless communication systems.

Another object is to provide a network unit comprising such an arrangement.

Yet another object is to provide a wireless communication device comprising such an arrangement.

Still another object is to provide a computer program for managing, when executed by a processor, security contexts at idle mode mobility of a wireless communication device between different wireless communication systems, and a corresponding computer-program product.

It is also an object to provide an apparatus for managing security contexts at idle mode mobility of a wireless communication device between different wireless communication systems.

A further object is to provide a method and arrangement for key derivation at idle mode mobility of a wireless communication device between different wireless communication systems.

These and other objects are met by embodiments of the proposed technology.

According to a first aspect, there is provided a method for managing security contexts at idle mode mobility of a wireless communication device between different wireless communication systems including a first wireless communication system and a second wireless communication system,
wherein the first wireless communication system is a 5G/NGS system and the second wireless communication system is a 4G/EPS system, said method comprising:
obtaining a 5G/NGS security context; and
mapping the 5G/NGS security context to a 4G/EPS security context.

The proposed technology thus provides an efficient and secure solution for handling idle mode mobility from 5G/NGS to 4G/EPS. The security context mapping also helps providing service continuity.

According to a second aspect, there is provided an arrangement configured to manage security contexts at idle mode mobility of a wireless communication device between different wireless communication systems including a first wireless communication system and a second wireless communication system,
wherein the first wireless communication system is a 5G/NGS system and the second wireless communication system is a 4G/EPS system,
wherein the arrangement is configured to obtain a 5G/NGS security context, and
wherein the arrangement is configured to map the 5G/NGS security context to a 4G/EPS security context.

According to a third aspect, there is provided a network unit comprising an arrangement as described herein.

According to a fourth aspect, there is provided a wireless communication device comprising an arrangement as described herein.

According to a fifth aspect, there is provided a computer program for managing, when executed by a processor, security contexts at idle mode mobility of a wireless communication device between different wireless communication systems including a first wireless communication system and a second wireless communication system The first wireless communication system is a 5G/NGS system and the second wireless communication system is a 4G/EPS system. The computer program comprises instructions, which when executed by the processor, cause the processor to:
obtain or access a 5G/NGS security context; and
map the 5G/NGS security context to a 4G/EPS security context.

According to a sixth aspect, there is provided a computer-program product comprising a computer-readable medium carrying a computer program according to the fifth aspect of the proposed technology.

According to a seventh aspect, there is provided an apparatus for managing security contexts at idle mode mobility of a wireless communication device between different wireless communication systems. The different wireless communication systems include a first wireless communication system and a second wireless communication system, wherein the first wireless communication system is a 5G/NGS system and the second wireless communication system is a 4G/EPS system. The apparatus includes an input module for obtaining a 5G/NGS security context, and a mapping module for mapping the 5G/NGS security context to a 4G/EPS security context.

The proposed technology may alternatively be regarded as a key management procedure or a key derivation procedure, as will be explained.

According to another aspect, there is thus provided a method for key derivation at idle mode mobility of a wireless communication device between different wireless communication systems including a first wireless communication system and a second wireless communication system. The first wireless communication system is a 5G/Next Generation System, 5G/NGS, system and the second wireless communication system is a 4G/Evolved Packet System, 4G/EPS, system. Basically the method comprises obtaining a 5G/NGS security context including a mobility management key $K_{AMF}$, and mapping the 5G/NGS security context to a 4G/EPS security context including deriving a 4G/EPS master key $K_{ASME}$ based on the mobility management key $K_{AMF}$.

According to yet another aspect, there is also provided an arrangement for key derivation at idle mode mobility of a wireless communication device between different wireless communication systems including a first wireless communication system and a second wireless communication system. The first wireless communication system is a 5G/Next Generation System, 5G/NGS, system and the second wireless communication system is a 4G/Evolved Packet System, 4G/EPS, system. The arrangement is configured to obtain a 5G/NGS security context including a mobility management key $K_{AMF}$. The arrangement is also configured to map the 5G/NGS security context to a 4G/EPS security context by deriving a 4G/EPS master key $K_{ASME}$ based on the mobility management key $K_{AMF}$.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 8A is a schematic block diagram illustrating an example of an arrangement configured to manage security contexts at idle mode mobility between different wireless communication systems according to an embodiment.

FIG. 8B is a schematic block diagram illustrating an example of an arrangement configured to manage security contexts at idle mode mobility according to another embodiment.

FIG. 8C is a schematic block diagram illustrating an example of an arrangement configured to manage security contexts at idle mode mobility according to yet another embodiment.

DETAILED DESCRIPTION

Throughout the drawings, the same reference numbers are used for similar or corresponding elements.

The proposed technology generally relates to management of security contexts at idle mode mobility of a wireless communication device between different wireless communication systems, especially between different generations of wireless communication systems. The proposed technology also concerns security management, and in particular key management in connection with idle mode mobility.

In the following, the general non-limiting term "network unit" may refer to any network unit suitable for operation in connection with a wireless communication system, including but not limited to network devices, network nodes and/or associated wireless communication devices.

As used herein, the term 'network device' may refer to any device located in connection with a communication network, including but not limited to devices in access networks, core networks and similar network structures. The term network device may also encompass computer-based network devices such as cloud-based network devices for implementation in cloud-based environments.

As used herein, the non-limiting term 'network node' may refer to any network node in a communication system including network nodes in access networks, core networks and similar network structures.

As used herein, the non-limiting terms "wireless communication device", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

It may be useful to briefly review the EPC key hierarchy for 4G/EPS/LTE and the corresponding key hierarchy proposed for 5G/NGS.

Figure 1:
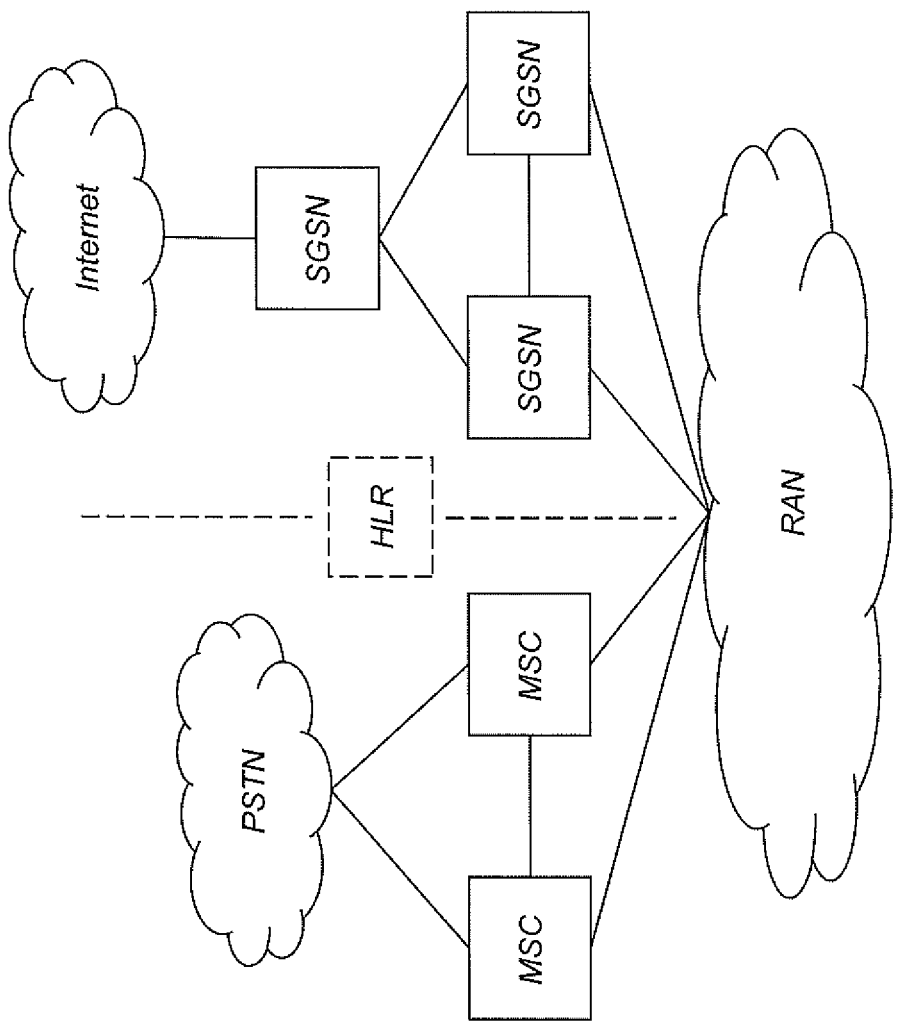
FIG. 1 is a schematic diagram illustrating a simplified overview of the core network for UMTS.
Figure 2:
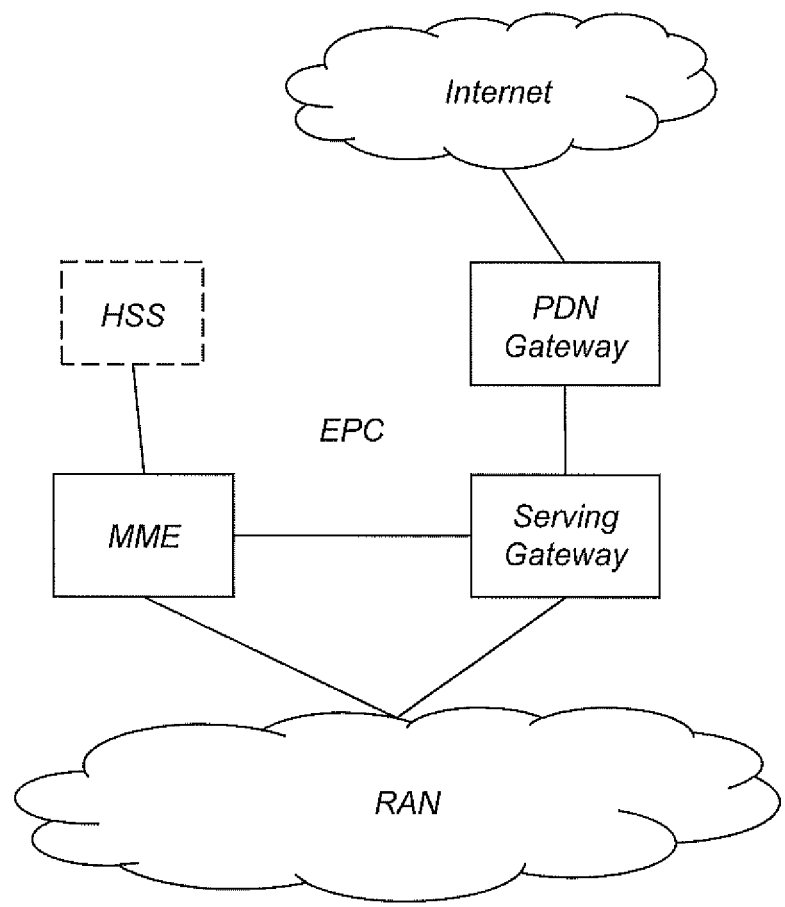
FIG. 2 is a schematic diagram illustrating a simplified overview of the EPC architecture.
Figure 3:
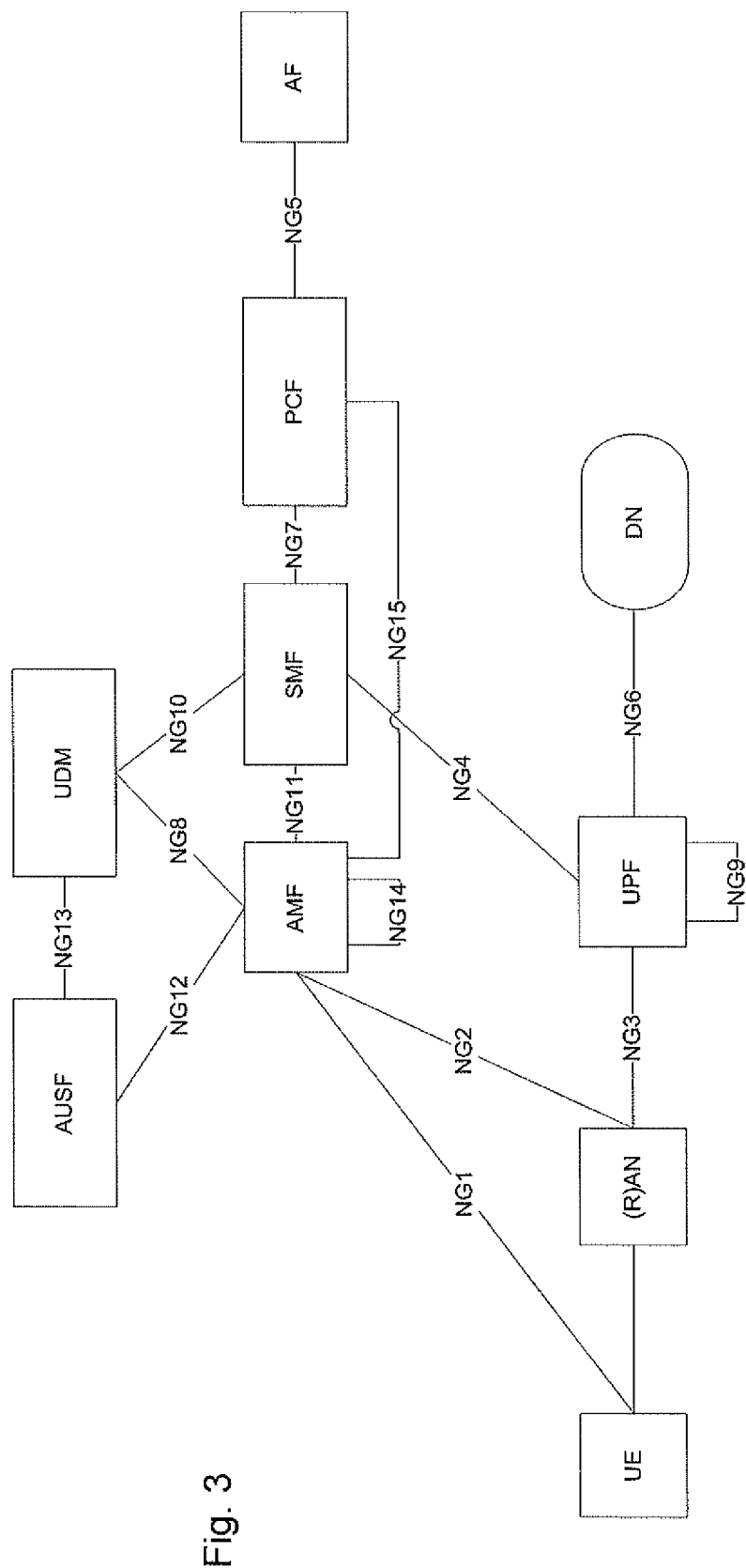
FIG. 3 is a schematic diagram illustrating an example of the non-roaming architecture proposed for 5G/NGS.
Figure 4:
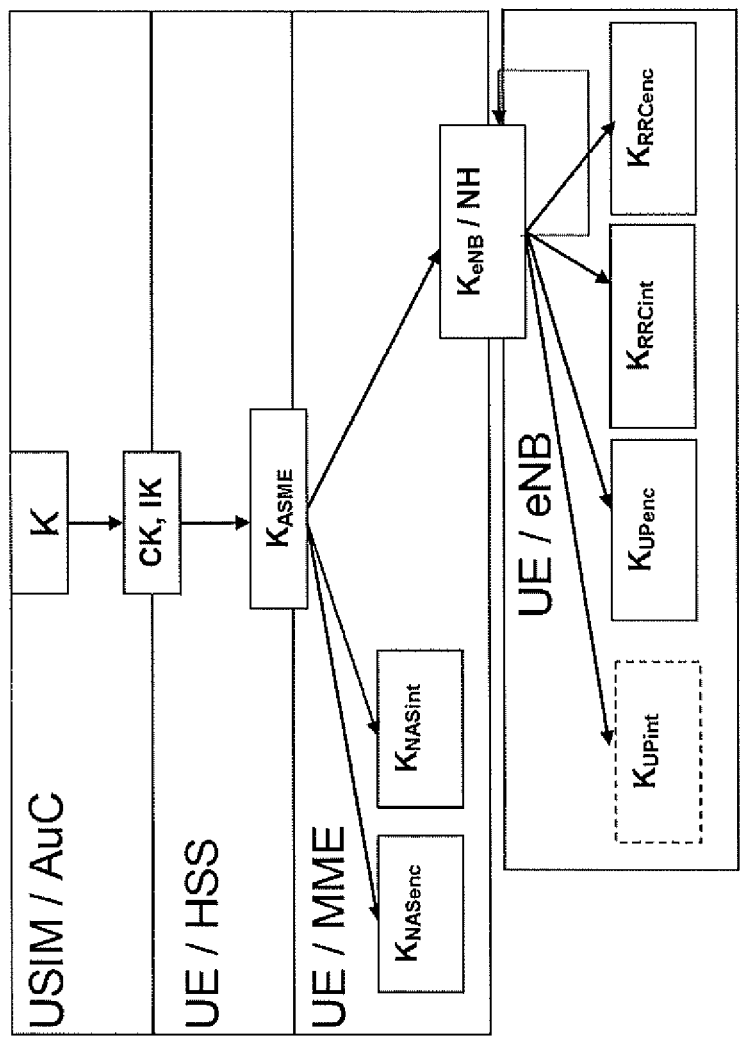
FIG. 4 schematically illustrates an example of the EPC key hierarchy for 4G/EPS/LTE.

FIG. 4 schematically illustrates an example of the EPC key hierarchy for 4G/EPS/LTE. The key hierarchy includes $K_{eNB}$, which is a key derived by the Mobile Equipment (ME)

in the UE and the MME from $K_{ASME}$ or by the ME and target eNB. NH is a key derived by ME and MME to provide forward security.

NAS protection uses two keys $K_{NASint}$ and $K_{NASenc}$. $K_{NASint}$ is used for protection of NAS traffic with a particular integrity algorithm, whereas $K_{NASenc}$ is correspondingly used for the protection of NAS traffic with a particular encryption algorithm. These keys are derived by the ME and the MME from $K_{ASME}$ and an identifier for the integrity algorithm or the encryption algorithm, respectively, using a Key Derivation Function (KDF).

Keys for User Plane (UP) traffic, $K_{UPenc}$, $K_{UPint}$, and Radio Resource Control (RRC) traffic, $K_{RRCenc}$, $K_{RRCint}$, are derived ME and eNB from $K_{eNB}$.

The figure also indicates a confidentiality key (CK) and an integrity key (IK) available at the UE and a HSS, and the subscription credential (K) stored at the Universal Subscriber Identity Module (USIM) and Authentication Center (AuC). More information of the EPS key hierarchy can be found in section 6.2 of 3GPP TS 33.401 V14.1.0.

3GPP SA3 is currently performing a study on Next Generation (5G) in 3GPP in TR 33.899. There are many proposals for key hierarchy in this study.

Figure 5:
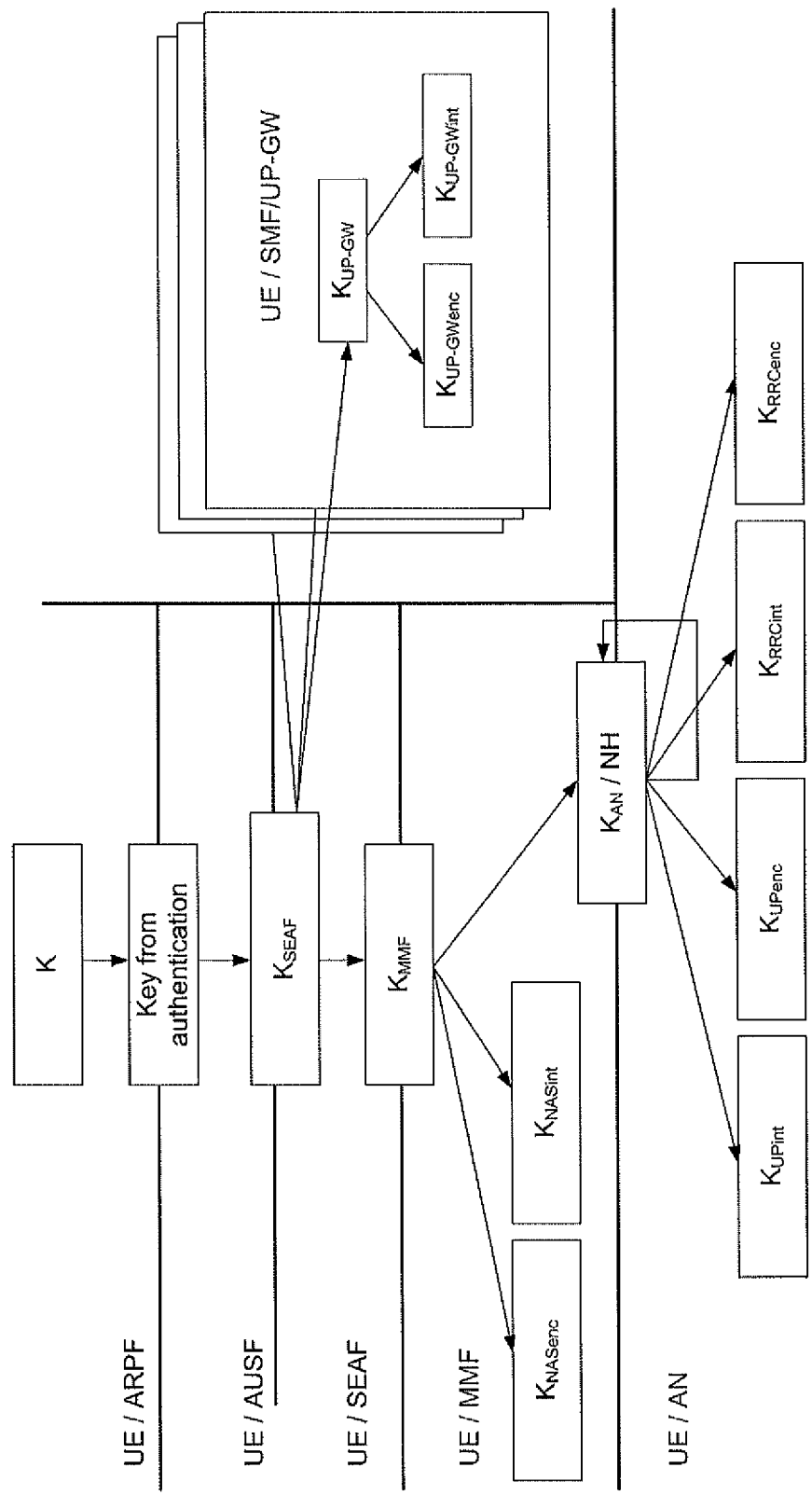
FIG. 5 illustrates an example of a key hierarchy that is proposed for 5G/NGS.

FIG. 5 illustrates an example of a key hierarchy that is proposed for 5G/NGS. In general, the key hierarchy is similar to that of 4G/EPS/LTE shown in FIG. 4 but with some differences, for instance, introduction of an additional layer of key hierarchy that allows a key resulting from the authentication to be held in a secure location. This in effect corresponds to splitting the key $K_{ASME}$ into the keys $K_{SEAF}$ and $K_{MMF}$.

In FIG. 5, K represents the subscription credential that is held in the UE and Authentication Credential Repository and Processing Function (ARPF)/Authentication, Authorization, and Accounting (AAA) server. $K_{SEAF}$ is an anchor key for the authentication session from which subsequent keys, e.g., CN control plane keys and AN keys, are derived. $K_{MMF}$ is a control plane key bound to MMF, which represents the core network entity that terminates the NAS Mobility Management (MM) signaling. The MMF and $K_{MMF}$ are also referred to as AMF and $K_{AMF}$, respectively, or CN-MM and $K_{CN}$, respectively, in the SA3 study.

Most proposed key hierarchies in the study have a $K_{SEAF}$ key stored in a so-called SEAF function. The SEAF function derives new keys for the core network nodes such as the AMF from $K_{SEAF}$. The AMF or MMF derives further NAS security keys from $K_{MMF}$. NAS encryption and integrity protection keys, $K_{NASenc}$ and $K_{NASint}$, are derived from $K_{MMF}$. $K_{MMF}$ may also be used to derive the AN level keys, such as $K_{UPenc}$, $K_{UPint}$, $K_{RRCenc}$, $K_{RRCint}$, using $K_{AN}$, which is the key provided to the AN and corresponds to $K_{eNB}$ in LTE.

$K_{UP-GW}$, also referred to as $K_{CN-SM/UP}$, is a user plane key for an UP-Gateway (GW) when the user plane security terminates at the UP-GW. More information of the NextGen key hierarchy can be found in section 5.1.4.6.2.2 of 3GPP TS 33.899 V0.6.0.

As mentioned, it is expected that 5G/NGS will allow idle mode mobility from 5G/NGS to 4G/EPS. When a UE moves out of 5G/NGS coverage into 4G/EPS coverage, it will have a 5G/NGS security context, but may not have a 4G/EPS security context. The inventors have realized that there is currently no solution for deriving a 4G/EPS security context from the 5G/NGS security context. This could help providing service continuity.

A "security context" normally includes at least one security key, possibly together with optional related information such as one or more freshness parameters.

Figure 6A:
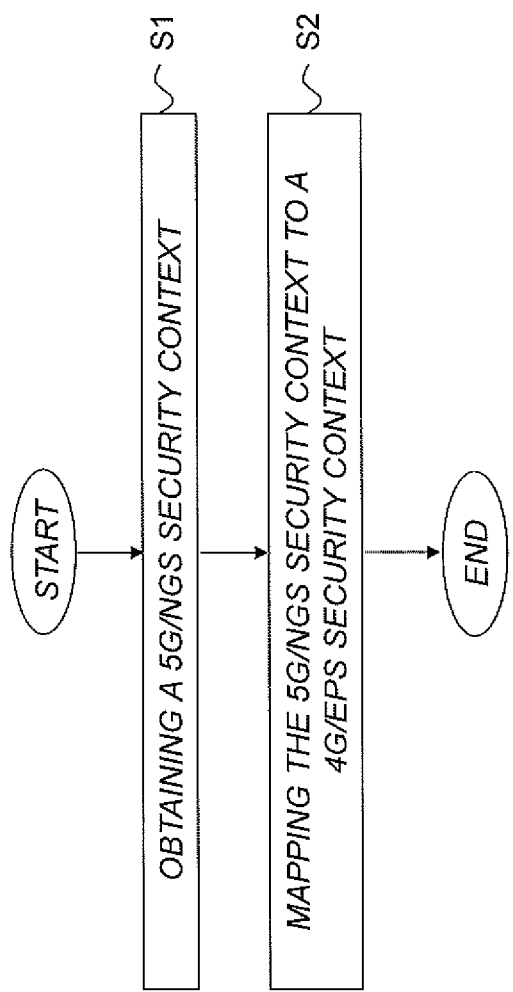
FIG. 6A is a schematic flow diagram illustrating an example of a method for managing security contexts at idle mode mobility between different wireless communication systems according to an embodiment.

FIG. 6A is a schematic flow diagram illustrating an example of a method for managing security contexts at idle mode mobility between different wireless communication systems according to an embodiment.

The different wireless communication systems include a first wireless communication system and a second wireless communication system, wherein the first wireless communication system is a 5G/NGS system and the second wireless communication system is a 4G/EPS system.

Basically, the method comprises:

S1: obtaining a 5G/NGS security context; and

S2: mapping the 5G/NGS security context to a 4G/EPS security context.

By way of example, the 5G/NGS system is a source system and the 4G/EPS system is a target system during idle mode mobility.

Sometimes, the source system is referred to as the old system and the target system is referred to as the new system. Typically, the 5G/NGS security context is available to or derivable from other security key information in the relevant network unit(s) of the 5G/NGS system and also in the wireless communication device, according to well-accepted technology.

Figure 6B:
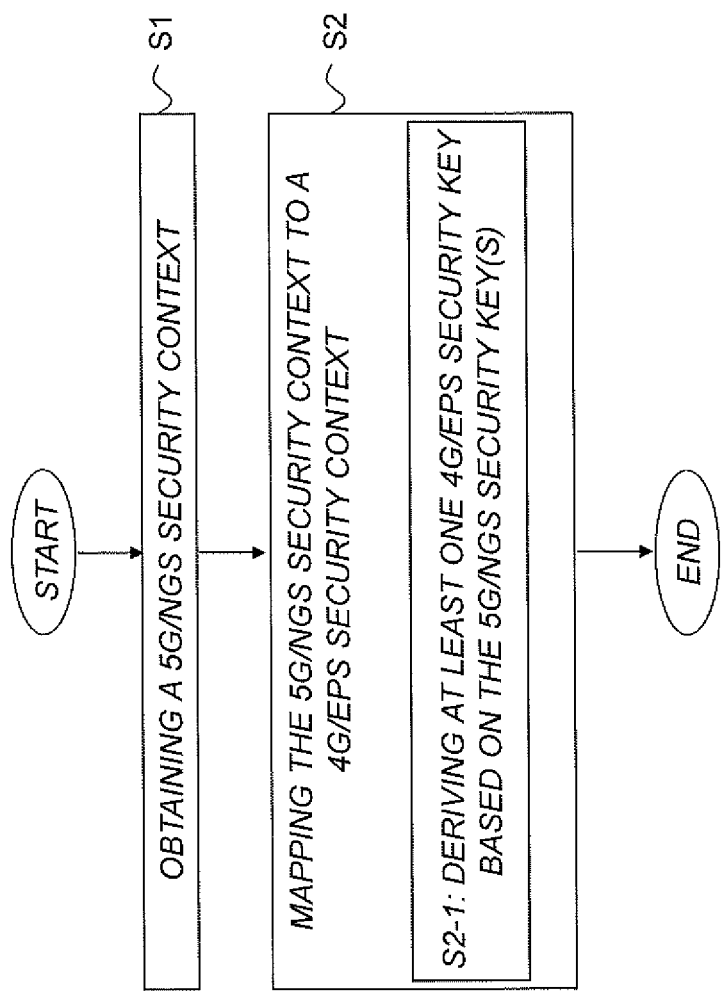
FIG. 6B is a schematic flow diagram illustrating another example of a method for managing security contexts at idle mode mobility between different wireless communication systems according to an embodiment.

FIG. 6B is a schematic flow diagram illustrating another example of a method for managing security contexts at idle mode mobility between different wireless communication systems according to an embodiment.

As an example, the 5G/NGS security context includes at least one 5G/NGS security key, and the step S2 of mapping the 5G/NGS security context to a 4G/EPS security context comprises deriving S2-1 at least one 4G/EPS security key based on the 5G/NGS security key(s), wherein the 4G/EPS security context comprises the 4G/EPS security key(s).

The terms "determining" and "calculating" may be used interchangeably with the term "deriving" in the context of key derivation.

The proposed technology may thus alternatively be regarded as a key management procedure or a key derivation procedure.

Optionally, the step of deriving at least one 4G/EPS security key based on the 5G/NGS security key(s) comprises deriving the 4G/EPS security key(s) also based on at least one freshness parameter.

In a particular example, the 5G/NGS security key(s) comprises a master key $K_{SEAF}$ available at the core network of the 5G/NGS system and the wireless communication device, and the 4G/EPS security key(s) comprises a master key $K_{ASME}$, wherein the step of deriving at least one 4G/EPS security key based on the 5G/NGS security key(s) comprises determining $K_{ASME}$ directly or indirectly based on $K_{SEAF}$.

For example, $K_{ASME}$ may be determined as a function of $K_{SEAF}$.

According to another example, $K_{ASME}$ is determined as a function of a mobility management key $K_{CN}$, which is derived from $K_{SEAF}$, wherein the mobility management key $K_{CN}$ is also referred to as $K_{AMF}$, where AMF refers to Access and Mobility management Function (as previously indicated).

By way of example, the method may be performed by a network unit of the 5G/NGS system.

Figure 6C:
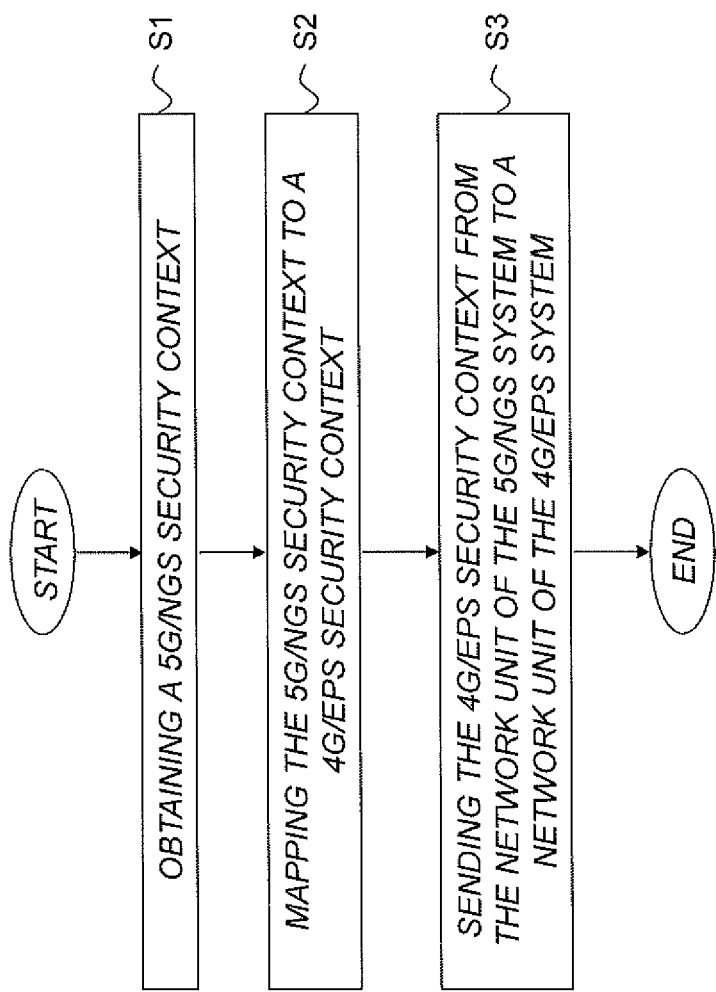
FIG. 6C is a schematic flow diagram illustrating yet another example of a method for managing security contexts at idle mode mobility between different wireless communication systems according to an embodiment.

In this context, the method may further comprise sending S3 the 4G/EPS security context from the network unit of the 5G/NGS system to a network unit of the 4G/EPS system, e.g. as illustrated in FIG. 6C.

As an example, the network unit of the 5G/NGS system may be a 5G/NGS core network unit configured for mobility management such as the AMF, also referred to as MMF or CN-MM.

Correspondingly, the network unit of the 4G/EPS system may be a core network unit configured for mobility management such as the MME.

In a particular example, the network unit of the 5G/NGS system receives a Context Request message from the network unit of the 4G/EPS system including a key set identifier, which identifies the 5G security context, and derives a 4G/EPS security key from the 5G/NGS security context, and sends a Context Response message including the derived 4G/EPS security key to the network unit of the 4G/EPS system.

For example, as indicated, the network unit of the 5G/NGS system may be an Access and Mobility management Function, AMF, unit, and the network unit of the 4G/EPS system may be a Mobility Management Entity, MME, unit.

By way of example, the Context Request message may further include a counter as a freshness parameter, and the 4G/EPS security key may be derived from the 5G/NGS security context and the counter.

As an example, the counter may be a Non-Access Stratum, NAS, sequence number.

For example, the key set identifier may originate from a Tracking Area Update, TAU, Request of the wireless communication device.

In a particular example, the network unit of the 5G/NGS system may be implemented as a cloud-based network device.

Complementary, the method may be performed by the considered wireless communication device such as a User Equipment.

In a particular example, the wireless communication device may send a Tracking Area Update, TAU, Request to the network side including a key set identifier that identifies the 5G/NGS security context.

In general, the proposed solution enables mapping of a 5G/NGS security context to a 4G/EPS security context at idle mode mobility from 5G/NGS to 4G/EPS.

This is so far the only solution for mapping of 5G/NGS security keys to 4G/EPS security keys during idle mode mobility from 5G/NGS to 4G/EPS.

In particular, the proposed solution prohibits the target core network in 4G/EPS, e.g. the MME, from getting any knowledge of the security keys used in source core network in 5G/NGS, e.g. the AMF or corresponding network unit.

Figure 6D:
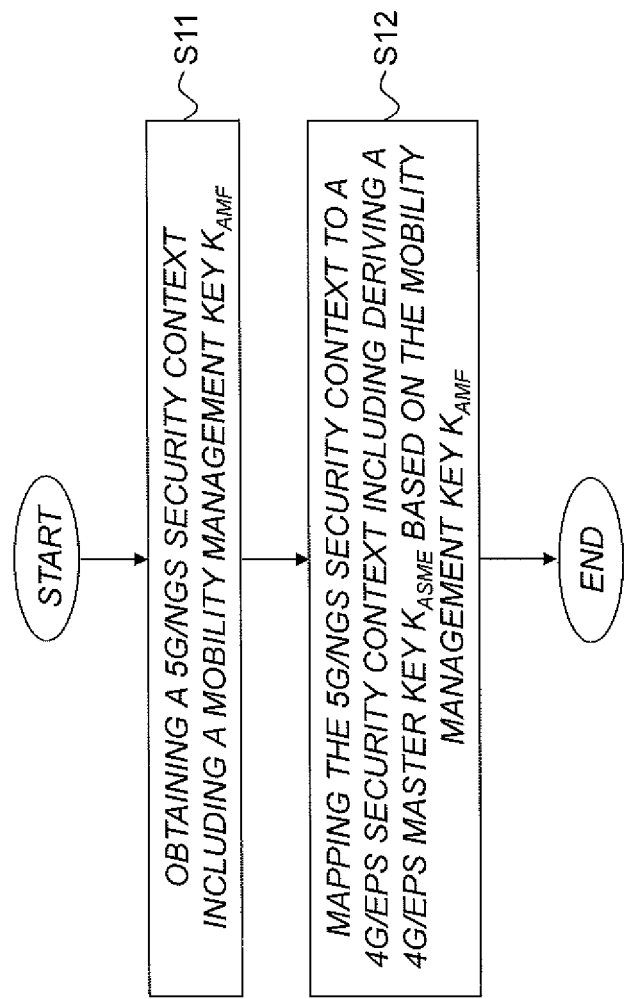
FIG. 6D is a schematic flow diagram illustrating an example of a method for key derivation at idle mode mobility between different wireless communication systems according to an embodiment.

FIG. 6D is a schematic flow diagram illustrating an example of a method for key derivation at idle mode mobility between different wireless communication systems according to an embodiment.

According to an aspect, there is also provided a method for key derivation at idle mode mobility of a wireless communication device between different wireless communication systems including a first wireless communication system and a second wireless communication system. The first wireless communication system is a 5G/Next Generation System, 5G/NGS, system and the second wireless communication system is a 4G/Evolved Packet System, 4G/EPS, system. Basically the method comprises:

S11: obtaining a 5G/NGS security context including a mobility management key $K_{AMF}$ (also referred to as $K_{CN}$); and S12: mapping the 5G/NGS security context to a 4G/EPS security context including deriving a 4G/EPS master key $K_{ASME}$ based on the mobility management key $K_{AMF}$.

Figure 7A:
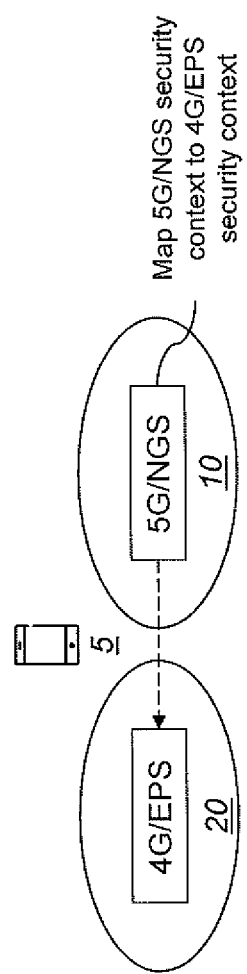
FIG. 7A is a schematic diagram illustrating an example of idle mode mobility of a wireless communication device between two different wireless communication systems according to an embodiment.

FIG. 7A is a schematic diagram illustrating an example of idle mode mobility of a wireless communication device between two different wireless communication systems according to an embodiment. The wireless communication systems comprises a first wireless communication system 10 such as a 5G/NGS system and a second wireless communication system 20 such as a 4G/EPS system. The wireless communication device 5 may be subject to idle mode mobility between the 5G/NGS system 10 as a source system and the 4G/EPS system 20 as a target system. In this context, a basic idea is to map the 5G/NGS security context to a 4G/EPS security context.

The proposed solution relates to methods and corresponding arrangements for mapping 5G/NGS security keys to 4G/EPS security keys, both at the network and at the UE side, during idle mode mobility.

In the following, the proposed technology will be described with reference to specific, illustrative examples. It should be understood that the proposed technology is not limited thereto.

A security context normally includes at least one security key, possibly together with optional related information. By way of example, the 5G/NGS security context is expected to include a master key $K_{SEAF}$ and/or possibly a key $K_{CN}$ derived from the $K_{SEAF}$. The 4G/EPS context normally includes a master key $K_{ASME}$.

During idle mode mobility in a 4G/EPS network, the Tracking Area Update (TAU) procedure is used to track the UE at the granularity of so called Tracking Areas (TA). The Tracking Area Update (TAU) procedure can also be used during idle mode mobility from a 5G/NGS network to a 4G/EPS network.

Figure 7B:
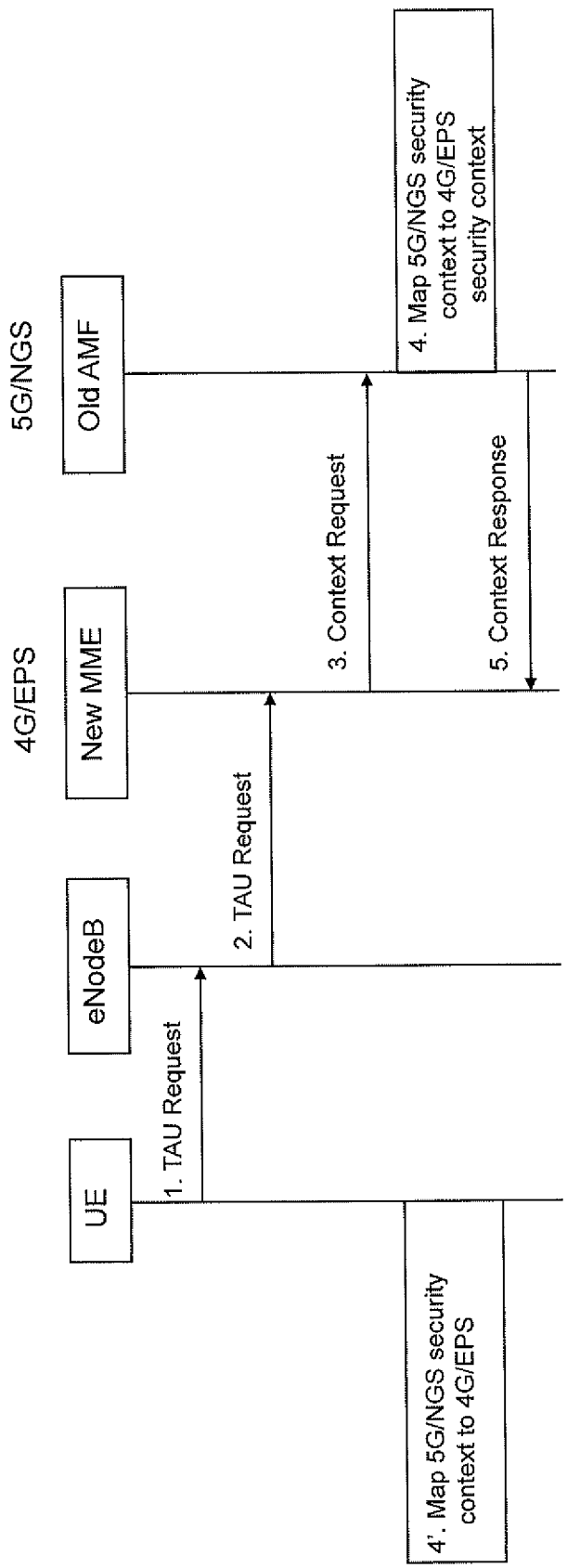
FIG. 7B is a schematic signaling and action diagram illustrating an example of signaling and/or actions performed by relevant network units according to an embodiment.

FIG. 7B is a schematic signaling and action diagram illustrating an example of signaling and/or actions performed by relevant network units according to an embodiment.

1. The UE initiates the TAU procedure by sending, to the eNodeB, a TAU Request including a key set identifier and optionally also a counter as freshness parameter. The key set identifier identifies the 5G security context at UE and AMF. The counter sent in the TAU Request may be a counter included in the 5G security context shared by UE and AMF. The UE may also generate a nonce as freshness parameter, or a timestamp instead of the nonce, and include it in the TAU Request.

By way of example, the key set identifier (eKSI) and counter (NAS sequence number) may be legacy parameters included in the TAU Request as described in clause 5.3.3.1, step 2 of the existing 3GPP standard TS 23.401. Also a nonce (nonce_UE) is a legacy parameter that can be included in a TAU Request, as described by clause 9.1.2 of 3GPP TS 33.401 and Table 8.2.29.1 of 3GPP TS 24.301. However, this nonce is usually not used for inter-MME change, but for SGSN-to-MME change.

2. The eNodeB forwards the TAU Request message to the new MME.

3. The new MME sends a Context Request message to the old AMF to retrieve user information including the security context. The Context Request contains the key set identifier, counter and possibly nonce sent by the UE in Step 1.

4. The old AMF derives a $K_{ASME}$ from the 5G security context.

Option A: $K_{ASME}$ is derived directly from the $K_{SEAF}$.

$K_{ASME}=f(K_{SEAF}$, optional freshness parameter(s), possibly target network parameters, possibly source network parameters, possibly constant value(s)), where f is a hash function or another key derivation function, and the freshness parameter(s) may be the counter and/or the nonce or timestamp, sent by the UE in step 1.

Optionally, there may also be one or more target network parameters and/or source network parameters included in the key derivation. The target network parameters are parameters that identify the target network at some level, for example the network name. The source network parameters are parameters that identify the source network at some level, for example the network name.

Optionally, there may also be one or more constant value included in the key derivation. The constant value may for example be an FC value used to distinguish between different instances of the key derivation.

Option B: $K_{ASME}$ is derived from the derived key $K_{CN}$.

$K_{ASME}=f(K_{CN}$, optional freshness parameter(s), possibly target network parameters, possibly source network parameters, possibly constant value(s)), where f is a hash function or another key derivation function, and the freshness parameter(s) may be the counter and/or the nonce or timestamp, sent by the UE in step 1.

Optionally, there may also be one or more target network parameters and/or source network parameters included in the key derivation. The target network parameters are parameters that identify the target network at some level, for example the network name. The source network parameters are parameters that identify the source network at some level, for example the network name.

Optionally, there may also be one or more constant value included in the key derivation. The constant value may for example be an FC value used to distinguish between different instances of the key derivation.

In this way, the AMF derives a $K_{ASME}$ from the 5G/NGS security context, which it then can send to the MME. This prohibits the target core network in 4G/EPS, e.g. the MME, from getting any knowledge of the security keys used in source core network in 5G/NGS, e.g. the AMF or corresponding network unit configured to handle mobility management.

5. The old AMF sends the key derived in Step 4 to the new MME in a Context Response message.

4'. The UE computes the derived key in the same way as the old AMF. This step is independent of the other steps and can be performed at any time during the procedure.

Option A: $K_{ASME}$ is derived directly from the $K_{SEAF}$.

$K_{ASME}=f(K_{SEAF}$, optional freshness parameter(s), possibly target network parameters, possibly source network parameters, possibly constant value(s)), where f is a hash function or another key derivation function, and the freshness parameter(s) may be the counter and/or the nonce or timestamp, sent by the UE in step 1.

Optionally, there may also be one or more target network parameters and/or source network parameters included in the key derivation. The target network parameters are parameters that identify the target network at some level, for example the network name. The source network parameters are parameters that identify the source network at some level, for example the network name.

Optionally, there may also be one or more constant value included in the key derivation. The constant value may for example be an FC value used to distinguish between different instances of the key derivation.

Option B: $K_{ASME}$ is derived from the derived key $K_{CN}$.

$K_{ASME}=f(K_{CN}$, optional freshness parameter(s), possibly target network parameters, possibly source network parameters, possibly constant value(s)), where f is a hash function or another key derivation function, and the freshness parameter(s) may be the counter and/or the nonce or timestamp, sent by the UE in step 1.

Optionally, there may also be one or more target network parameters and/or source network parameters included in the key derivation. The target network parameters are parameters that identify the target network at some level, for example the network name. The source network parameters are parameters that identify the source network at some level, for example the network name.

Optionally, there may also be one or more constant value included in the key derivation. The constant value may for example be an FC value used to distinguish between different instances of the key derivation.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a second aspect, there is provided an arrangement configured to manage security contexts at idle mode mobility of a wireless communication device between different wireless communication systems including a first wireless communication system and a second wireless communication system, wherein the first wireless communication system is a 5G/NGS system and the second wireless communication system is a 4G/EPS system, wherein the arrangement is configured to obtain a 5G/NGS security context, and wherein the arrangement is configured to map the 5G/NGS security context to a 4G/EPS security context.

Normally, the 5G/NGS system is a source system and the 4G/EPS system is a target system during idle mode mobility.

By way of example, the 5G/NGS security context includes at least one 5G/NGS security key, and the arrangement may be configured to derive at least one 4G/EPS security key based on the 5G/NGS security key(s), wherein the 4G/EPS security context comprises the 4G/EPS security key(s).

The proposed technology may thus alternatively be regarded as an arrangement for key management or an arrangement for key derivation.

As an example, the arrangement may be configured to derive the 4G/EPS security key(s) also based on at least one freshness parameter.

In a particular example, the 5G/NGS security key(s) comprises a master key $K_{SEAF}$ available at the core network of the 5G/NGS system and the wireless communication device, and the 4G/EPS security key(s) comprises master key $K_{ASME}$, wherein the arrangement is configured to determine $K_{ASME}$ directly or indirectly based on $K_{SEAF}$.

For example, as mentioned, $K_{ASME}$ may be determined as a function of $K_{SEAF}$.

In another example, $K_{ASME}$ may be determined as a function of a mobility management key $K_{CN}$, which is derived from $K_{SEAF}$. Accordingly, the arrangement may be configured to determine $K_{ASME}$ as a function of a mobility management key $K_{CN}$, which is derived from $K_{SEAF}$, wherein the mobility management key $K_{CN}$ is also referred to as $K_{AMF}$, where AMF refers to Access and Mobility management Function.

According to a complementary aspect, there is also provided a corresponding arrangement for key derivation at idle mode mobility of a wireless communication device between different wireless communication systems including a first wireless communication system and a second wireless communication system. The first wireless communication system is a 5G/Next Generation System, 5G/NGS, system and the second wireless communication system is a 4G/Evolved Packet System, 4G/EPS, system. The arrangement is configured to obtain a 5G/NGS security context including a mobility management key $K_{AMF}$ (also referred to as $K_{CN}$). The arrangement is also configured to map the 5G/NGS security context to a 4G/EPS security context by deriving a 4G/EPS master key $K_{ASME}$ based on the mobility management key $K_{AMF}$.

FIG. 8A is a schematic block diagram illustrating an example of an arrangement configured to manage security contexts at idle mode mobility between different wireless communication systems according to an embodiment. In this particular example, the arrangement 100 comprises a processor 101 and a memory 102, the memory 102 comprising instructions executable by the processor 101, whereby the processor is operative to perform the functions described herein, e.g. to manage security contexts at idle mode mobility.

Optionally, the arrangement 100 may also include an input/output (I/O) unit 103. The I/O unit 103 may include functions for wired and/or wireless communication with other devices and/or network nodes in the network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, input port(s) and/or output port(s).

FIG. 8B is a schematic block diagram illustrating an example of an arrangement configured to manage security contexts at idle mode mobility according to another embodiment. In this example, the arrangement 110 is based on a hardware circuitry implementation. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

FIG. 8C is a schematic block diagram illustrating an example of an arrangement configured to manage security contexts at idle mode mobility according to yet another embodiment. In this example, the arrangement 120 is based on combination of both processor(s) 122, 123 and hardware circuitry 124, 125 in connection with suitable memory unit(s) 121. The arrangement 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 9B:
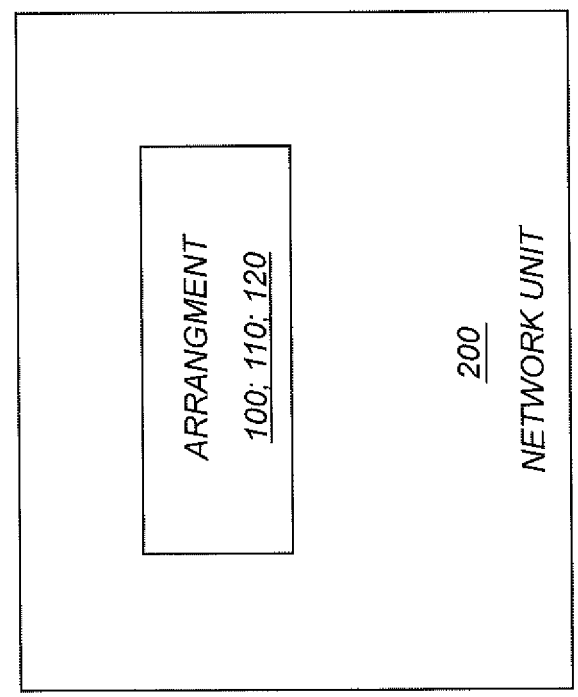
FIG. 9B is a schematic block diagram illustrating an example of a wireless communication device according to an embodiment.
Figure 9A:
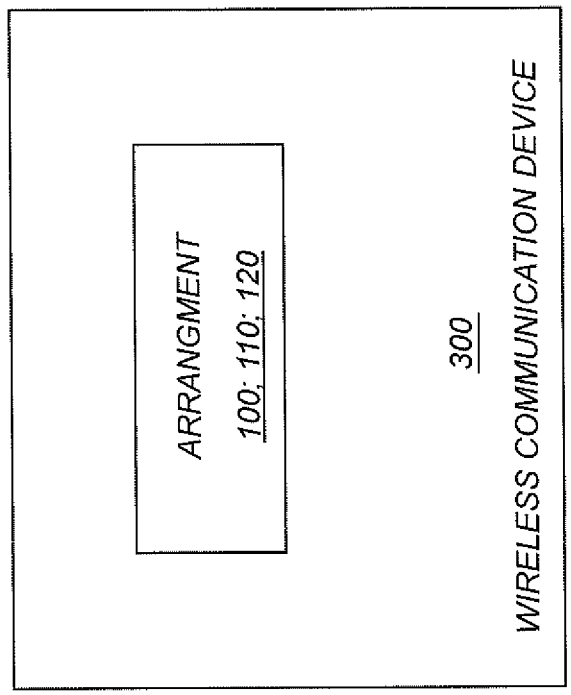
FIG. 9A is a schematic block diagram illustrating an example of a network unit according to an embodiment.

FIG. 9A is a schematic block diagram illustrating an example of a network unit according to an embodiment. The network unit 200 comprises an arrangement 100; 110; 120 according to the second aspect of the proposed technology.

By way of example, the network unit may be a network unit of the 5G/NGS system.

In particular, the network unit of the 5G/NGS system may be a core network unit configured for mobility management such as AMF, also referred to as MMF or CN-MM.

As an example, the network unit of the 5G/NGS system may be configured to send the 4G/EPS security context to a network unit of the 4G/EPS system.

In a particular example, the network unit of the 5G/NGS system may be configured to receive a Context Request message from the network unit of the 4G/EPS system including a key set identifier, which identifies the 5G security context, and derive a 4G/EPS security key from the 5G/NGS security context, and send a Context Response message including the derived 4G/EPS security key to the network unit of the 4G/EPS system.

For example, the network unit of the 5G/NGS system may be an Access and Mobility management Function, AMF, unit, and the network unit of the 4G/EPS system may be a Mobility Management Entity, MME, unit.

By way of another example, the network unit may be a computer-based network device, e.g. implemented in a network node or as a cloud-based network device for arrangement in connection with the wireless communication system.

FIG. 9B is a schematic block diagram illustrating an example of a wireless communication device according to an embodiment. The wireless communication device 300 comprises an arrangement 100; 110; 120 according to the second aspect of the proposed technology.

By way of example, the wireless communication device may be a User Equipment.

Figure 10:
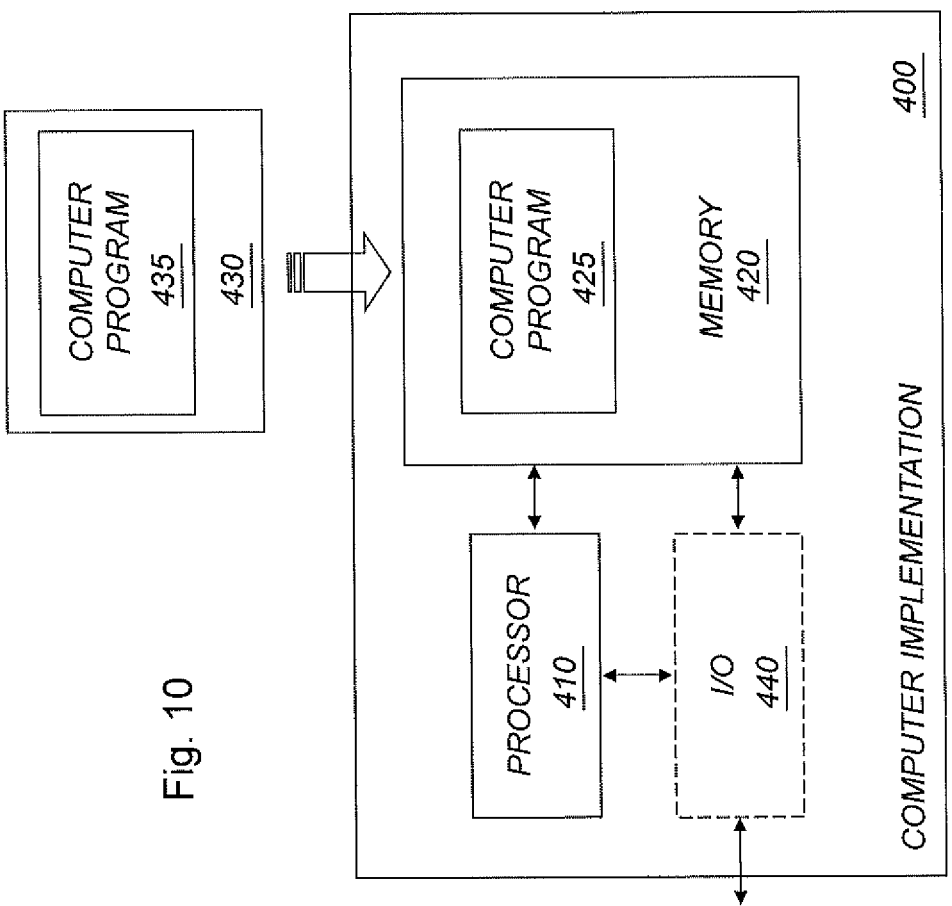
FIG. 10 is a schematic diagram illustrating an example of a computer-implementation according to an embodiment.

FIG. 10 is a schematic diagram illustrating an example of a computer-implementation 400 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to perform the actions described herein.

According to another aspect, there is provided a computer program for managing, when executed by a processor, security contexts at idle mode mobility of a wireless communication device between different wireless communication systems including a first wireless communication system and a second wireless communication system. The first wireless communication system is a 5G/NGS system and the second wireless communication system is a 4G/EPS system.

The computer program comprises instructions, which when executed by the processor, cause the processor to:
 obtain or access a 5G/NGS security context; and
 map the 5G/NGS security context to a 4G/EPS security context.

According to yet another aspect, there is provided a computer program product comprising a computer-readable medium in which a computer program of the above aspect is carried or stored.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 11:
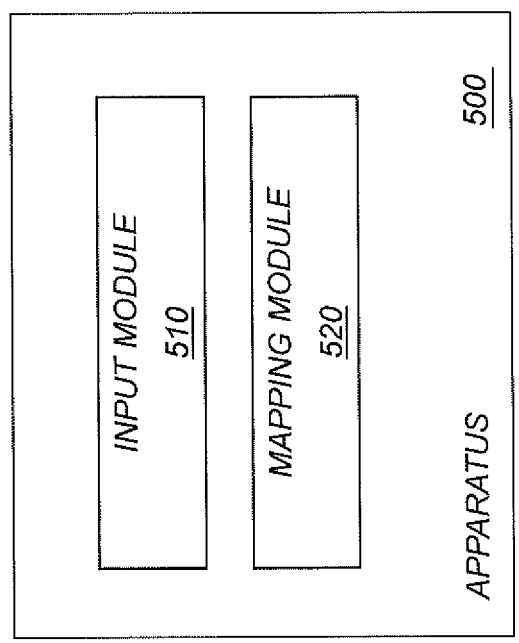
FIG. 11 is a schematic diagram illustrating an example of an apparatus for managing security contexts at idle mode mobility between different wireless communication systems according to an embodiment according to an embodiment.

FIG. 11 is a schematic diagram illustrating an example of an apparatus for managing security contexts at idle mode mobility of a wireless communication device between different wireless communication systems. The different wireless communication systems include a first wireless communication system and a second wireless communication system, wherein the first wireless communication system is a 5G/NGS system and the second wireless communication system is a 4G/EPS system. The apparatus includes an input module 510 for obtaining a 5G/NGS security context, and a mapping module 520 for mapping the 5G/NGS security context to a 4G/EPS security context.

Alternatively it is possible to realize the module(s) in FIG. 11 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The proposed technology is generally applicable to management of security contexts in wireless communications. The proposed technology may be applied to many specific applications and communication scenarios including secure communication within wireless networks, securely providing various services within such networks, including so-called Over-the-Top (OTT) services. For example, the proposed technology may provide the underlying security context(s) for secure communication, and enables and/or includes transfer and/or transmission and/or reception of relevant user data and/or control data in wireless communications.

In a complementary aspect, the proposed technology relates to a method, performed by a wireless device, further involving providing user data, and forwarding the user data to a host computer via the transmission to a network node.

In another complementary aspect, the proposed technology relates to a corresponding wireless device comprising processing circuitry configured to perform any of the steps of such a method.

In yet another complementary aspect, the proposed technology relates to a method, performed by a network node, further involving obtaining user data, and forwarding the user data to a host computer or a wireless device.

In still another complementary aspect, the proposed technology relates to a corresponding network node such as a base station comprising processing circuitry configured to perform any of the steps of such a method.

The proposed technology may also relate to a corresponding communication system including a host computer and/or a wireless device and/or a network node.

It is also becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.
  Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

Figure 12:
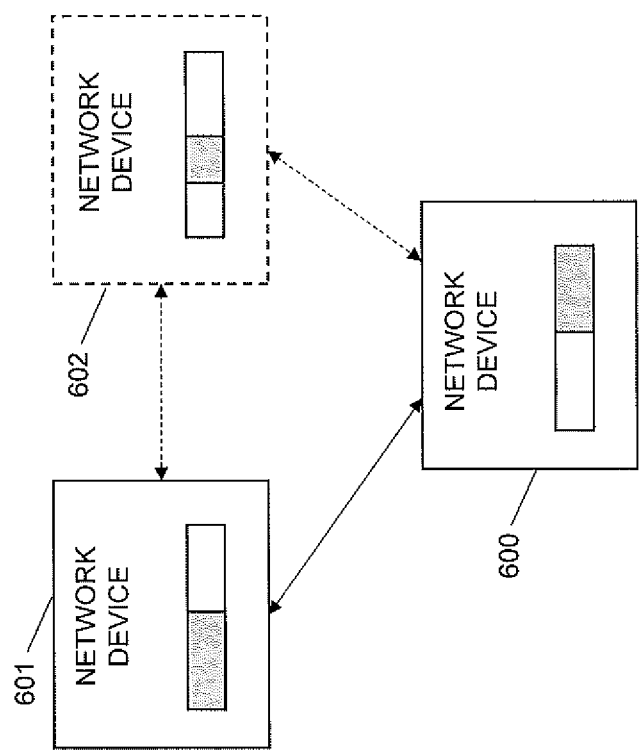
FIG. 12 schematically illustrates a distributed implementation among network devices.

FIG. 12 is a schematic diagram illustrating an example of how functionality can be distributed or partitioned between different network devices in a general case. In this example, there are at least two individual, but interconnected network devices 600, 601, which may have different functionalities, or parts of the same functionality, partitioned between the network devices 600, 601. There may be additional network devices 602 being part of such a distributed implementation. The network devices 600, 601, 602 may be part of the same wireless or wired communication system, or one or more of the network devices may be so-called cloud-based network devices located outside of the wireless or wired communication system.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. An apparatus configured to manage security contexts at idle mode mobility of a wireless communication device between a 5G/NGS system and a 4G/EPS system, wherein the 5G/NGS system is a source system and the 4G/EPS system is a target system during idle mode mobility, the apparatus being configured to:
   receive from a Mobility Management Entity (MME) a Context Request message comprising a key set identifier that identifies a 5G/NGS security context;
   after receiving the Context Request message from the MME, obtain the 5G/NGS security context, wherein the 5G/NGS security context includes at least one 5G/NGS security key; and
   map the 5G/NGS security context to a 4G/EPS security context, wherein the apparatus is configured to map the 5G/NGS security context to the 4G/EPS security context by performing a process that includes deriving at least one 4G/EPS security key based on one or more of the 5G/NGS security key(s), wherein the 4G/EPS security context comprises the 4G/EPS security key(s); and
   after deriving the 4G/EPS security key(s), transmitting to the MME a Context Response message responsive to the Context Request message, wherein the Context Response message comprises the at least one 4G/EPS security key.

2. The apparatus of claim 1, wherein the 5G/NGS security key(s) comprises a master key $K_{SEAF}$, and the 4G/EPS security key(s) comprises a master key $K_{ASME}$, and wherein the apparatus is configured to determine $K_{ASME}$ directly or indirectly based on $K_{SEAF}$.

3. The apparatus of claim 2, wherein the apparatus is configured to determine $K_{ASME}$ as a function of a mobility management key $K_{CN}$, which is derived from $K_{SEAF}$, wherein the mobility management key $K_{CN}$ is also referred to as $K_{AMF}$, where AMF refers to Access and Mobility management Function.

4. The apparatus of claim 1, wherein the apparatus comprises a processor and memory, the memory comprising instructions executable by the processor whereby the processor is operative to manage security contexts at idle mode mobility.

5. A network unit comprising the apparatus of claim 1.

6. The network unit of claim 5, wherein the network unit is a network unit of the 5G/NGS system.

7. The network unit of claim 6, wherein the network unit of the 5G/NGS system is a core network unit configured for mobility management.

8. The network unit of claim 6, wherein the network unit of the 5G/NGS system is an Access and Mobility management Function unit.

9. The network unit of claim 5, wherein the network unit is a computer-based network device.

10. The network unit of claim 9, wherein the computer-based network device is implemented in a network node or as a cloud-based network device for arrangement in connection with the wireless communication system.

11. A method for managing security contexts at idle mode mobility of a wireless communication device between a 5G/Next Generation System (5G/NGS) system and a 4G/Evolved Packet System (4G/EPS) system, wherein the 5G/NGS system is a source system and the 4G/EPS system is a target system during idle mode mobility, the method comprising:
   obtaining a 5G/NGS security context, wherein the 5G/NGS security context includes at least one 5G/NGS security key;
   mapping the 5G/NGS security context to a 4G/EPS security context, wherein mapping the 5G/NGS security context to the 4G/EPS security context comprises deriving at least one 4G/EPS security key based on one or more of the 5G/NGS security key(s), and the 4G/EPS security context comprises the derived 4G/EPS security key(s);
   prior to obtaining the 5G/NGS security context key and mapping the 5G/NGS security context to the 4G/EPS security context, receiving from a Mobility Management Entity (MME) a Context Request message comprising a key set identifier that identifies the 5G/NGS security context; and
   after receiving the Context Request message and after deriving the at least one 4G/EPS security key, transmitting to the MME a Context Response message responsive to the Context Request message, wherein the Context Response message comprises the at least one 4G/EPS security key.

12. The method of claim 11, wherein the 5G/NGS security key(s) comprises a master key $K_{SEAF}$, and the 4G/EPS security key(s) comprises a master key $K_{ASME}$, wherein the step of deriving at least one 4G/EPS security key based on the 5G/NGS security key(s) comprises determining the master key $K_{ASME}$ directly or indirectly based on $K_{SEAF}$.

13. The method of claim 12, wherein $K_{ASME}$ is determined as a function of a mobility management key $K_{CN}$, which is derived from $K_{SEAF}$, wherein the mobility management key $K_{CN}$ is also referred to as $K_{AMF}$, where AMF refers to Access and Mobility management Function.

14. The method of claim 11, wherein the method is performed by a network unit of the 5G/NGS system.

15. The method of claim 14, wherein the Context Response message further comprises the 4G/EPS security context.

16. The method of claim 14, wherein the network unit of the 5G/NGS system is a 5G/NGS core network unit configured for mobility management.

17. The method of claim 14, wherein the network unit of the 5G/NGS system is implemented as a cloud-based network device.

18. The method of claim 11, wherein the network unit of the 5G/NGS system is an Access and Mobility management Function (AMF) unit.

19. The method of claim 11, wherein the Context Request message further includes a counter as a freshness parameter, and the 4G/EPS security key is derived from the 5G/NGS security context and the counter.

20. The method of claim 19, wherein the counter is a Non-Access Stratum (NAS) sequence number.

21. The method of claim 11, wherein the key set identifier originates from a Tracking Area Update (TAU) Request transmitted by a wireless communication device.

* * * * *